US011858780B1

(12) United States Patent
Wang et al.

(10) Patent No.: US 11,858,780 B1
(45) Date of Patent: Jan. 2, 2024

(54) GOVERNOR ASSEMBLY, ELEVATOR SAFETY DEVICE AND ELEVATOR SYSTEM

(71) Applicant: Otis Elevator Company, Farmington, CT (US)

(72) Inventors: Wei Wang, Shanghai (CN); Decheng Meng, Shanghai (CN); Yong Zhao, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/989,238

(22) Filed: Nov. 17, 2022

(30) Foreign Application Priority Data

Sep. 29, 2022 (CN) ......................... 202211198424.4

(51) Int. Cl.
*B66B 5/04* (2006.01)
*B66B 5/22* (2006.01)

(52) U.S. Cl.
CPC ................ *B66B 5/044* (2013.01); *B66B 5/22* (2013.01)

(58) Field of Classification Search
CPC .................................. B66B 5/044; B66B 5/22
See application file for complete search history.

(56) References Cited

U.S. PATENT DOCUMENTS 11,465,881 B2 * 10/2022 Shi ............................ B66B 1/32
2013/0098711 A1 * 4/2013 Aguado .................. B66B 5/044 187/373

FOREIGN PATENT DOCUMENTS

CN 1597485 A * 3/2005 ............. B66B 5/044
CN 104016205 A * 9/2014
CN 209143437 U * 7/2019

OTHER PUBLICATIONS

Machine Translation to CN 104016205.*
Machine Translation to CN 1597485.*

* cited by examiner

*Primary Examiner* — Diem M Tran
(74) *Attorney, Agent, or Firm* — CANTOR COLBURN LLP

(57) ABSTRACT

A governor assembly, an elevator safety device, and an elevator system. The governor assembly includes: a bracket; a rotatable rope sheave mounted on the bracket; and a centrifugal mechanism associated with the rope sheave, a plurality of centrifugal members being capable of unfolding under an inertial force associated with the speed of the rope sheave; the centrifugal mechanism includes: a plurality of centrifugal members pivotally connected to the rope sheave; and a retaining mechanism by which the plurality of centrifugal members are retained in a contraction position; the retaining mechanism is configured to retain the plurality of centrifugal members in the contraction position when the speed of the rope sheave increases to a first threshold with an acceleration smaller than a first acceleration.

20 Claims, 13 Drawing Sheets

GOVERNOR ASSEMBLY, ELEVATOR SAFETY DEVICE AND ELEVATOR SYSTEM

FOREIGN PRIORITY

This application claims priority to Chinese Patent Application No. 202211198424.4, filed Sep. 29, 2022 and all the benefits accruing therefrom under 35 U.S.C. § 119, the contents of which in its entirety are herein incorporated by reference.

FIELD OF THE INVENTION

The present invention relates to the field of elevator safety, and in particular to a governor assembly and an elevator system.

BACKGROUND OF THE INVENTION

With the development of governor assembly technology for elevators, the Car Mounted Governor (CMG) assembly has been widely used. Compared with the design of mounting the governor on top of the hoistway in conventional governor assemblies either with or without machine room, the CMG assembly is mounted on the elevator car and moves up and down with the car. The CMG assembly is more compact in structure and suitable for use in situations where hoistway space is limited. The U.S. patent US2013/0098711A1 published on Apr. 25, 2013 by Aguado et al. discloses a CMG assembly, the full text of which is incorporated here by reference. In the governor assembly invented by Aguado et al. the centrifugal mechanism rotating with the rope sheave can unfolded when the speed of the rope sheave exceeds a first triggering speed, so as to trigger the trigger switch to cut the power of the tractor. When the speed of the rope sheave exceeds a second triggering speed greater than the first triggering speed, the roller on the inner side of the connecting rod of the centrifugal mechanism will engage with the core ring and rocker arm so that the core ring and rocker arm are driven by the rope sheave and pull the safety gear, such that the safety gear can be brought into mechanical frication with the guide rail to stop the car. In such a CMG assembly, the governor assembly also comprises a remote trigging device. The remote trigging device can be actively controlled to act on the centrifugal mechanism so that the governor assembly can be actively triggered in absence of elevator car overspeed for purposes such as testing.

Before the elevator is put into service, various safety tests are usually required, and the car is usually empty during the safety test. At this time, the weight of the counterweight is generally about 1.5 times the weight of the empty car. The weight difference will result in a sudden upward acceleration of the car (the car is pulled up by the counterweight) in the delay time between the loss of power to the tractor and the functioning of the brake system of the tractor, which can be referred to as "car rebound" that may result in false triggering of the governor, which may lead to related problems such as failed delivery tests or the need for technicians to restore the governor.

SUMMARY OF THE INVENTION

The object of the present application is to solve or at least alleviate the problems existing in the prior art.

According to one aspect, a governor assembly is provided, which comprises: a bracket; a rotatable rope sheave mounted on the bracket; and a centrifugal mechanism associated with the rope sheave; wherein, the centrifugal mechanism comprises: a plurality of centrifugal members pivotally connected to the rope sheave, the plurality of centrifugal members being capable of unfolding under an inertial force associated with the speed of the rope sheave; and a retaining mechanism by which the plurality of centrifugal members are retained in a contraction position; wherein, the retaining mechanism is configured to retain the plurality of centrifugal members in the contraction position when the speed of the rope sheave increases to a first threshold with an acceleration smaller than a first acceleration.

Optionally, in an embodiment of the governor assembly, the first threshold is equal to or greater than the speed of the rope sheave corresponding to 115% of the rated speed of the elevator car.

Optionally, in an embodiment of the governor assembly, the first threshold is equal to or greater than the speed of the rope sheave corresponding to 120% of the rated speed of the elevator car.

Optionally, in an embodiment of the governor assembly, the plurality of centrifugal members progressively unfold under the inertial force as the speed of the rope sheave increases. A trigger switch is provided on the radial outer side of the centrifugal mechanism on the bracket. When the speed of the rope sheave reaches a first triggering speed greater than the first threshold, the plurality of centrifugal members unfold to a first triggering position, and the trigger switch is triggered by the outer side of one of the plurality of centrifugal members.

Optionally, in an embodiment of the governor assembly, the first triggering speed corresponds to the speed of the rope sheave when the speed of the elevator car is greater than 130% of the rated speed.

Optionally, in an embodiment of the governor assembly, the centrifugal mechanism is configured so that when the speed of the rope sheave reaches a second triggering speed greater than the first triggering speed, the plurality of centrifugal members unfold to a second triggering position, in which the inner sides of the plurality of centrifugal members are connected to a core ring such that the rotation of the rope sheave will drive the core ring and a rocker arm connected to the core ring to rotate. The rocker arm is connected to a safety gear through a transmission device, so that the rotation of the rocker arm brings the safety gear to be in friction with the elevator guide rail.

Optionally, in an embodiment of the governor assembly, the retaining mechanism is a tension spring connected between adjacent centrifugal members, wherein the tension spring is configured to be pre-stretched at the contraction position.

Optionally, in an embodiment of the governor assembly, the retaining mechanism is a magnetic attraction device between adjacent centrifugal members configured to provide sufficient magnetic attraction force at the contraction position, so that the plurality of centrifugal members are still retained at the contraction position when the speed of the rope sheave slowly increases to a speed corresponding to 115% of the rated speed of the elevator.

Optionally, in an embodiment of the governor assembly, the governor assembly further comprises a remote triggering device on the radial outer side of the centrifugal mechanism on the bracket, wherein the remote triggering device acts on the centrifugal mechanism upon receipt of a trigger signal from the remote trigger switch to force the centrifugal mechanism to unfold to the second triggering position.

An elevator safety device is further provided, which comprises: the governor assembly according to various embodiments; and a transmission device associated with the governor assembly; wherein, when the centrifugal mechanism is at a second triggering position, the plurality of centrifugal members couple the rope sheave with the core ring, so that when the rope sheave rotates in a direction corresponding to the descent direction of the car, the core ring and the rocker arm connected to the core ring rotate, which drives the safety gear through the transmission device, and wherein, the transmission device comprises a first component and a second component connected to each other through a pivot pin and a vertically oriented elongated hole, so that during an initial stroke of the rocker arm rotation, the pivot pin first moves in the elongated hole until the pivot pin engages with an end of the elongated hole, and then the rotation of the rocker arm is transmitted to the safety gear, thereby triggering the safety gear to be in frictional contact with the elevator guide rail.

Optionally, in an embodiment of the elevator safety device, the size of the elongated hole is configured to be greater than the stroke of car rebound when the governor is triggered by the remote triggering device.

Optionally, in an embodiment of the elevator safety device, the transmission device comprises: a vertical connecting rod pivotally connected with the rocker arm; and a rotary rod, with a first end thereof pivotally connected to a fixed bracket, a middle part thereof connected to the bottom of the vertical connecting rod, and a second end thereof connected to a pull actuator of the safety gear.

Optionally, in an embodiment of the elevator safety device, an elongated hole is provided at the bottom of the vertical connecting rod and a pivot pin is provided at the middle part of the rotary rod; or an elongated hole is provided on the pull actuator of the safety gear and a pivot pin is provided at the second end of the rotary rod.

Optionally, in an embodiment of the elevator safety device, the governor assembly further comprises a spring element acting on the rotary rod or the connecting rod to provide a retaining force to the rotary rod or the connecting rod during the car rebound.

An elevator safety device is still further provided, which comprises: a governor assembly and a transmission device associated with the governor assembly; the governor assembly comprising: a bracket; a rope sheave rotatably mounted on the bracket; a centrifugal mechanism associated with the rope sheave; and a remote triggering device on the radial outer side of the centrifugal mechanism on the bracket, wherein when the centrifugal mechanism is triggered by the remote triggering device, the plurality of centrifugal members couple the rope sheave with a core ring, so that when the rope sheave rotates in a direction corresponding to the descent direction of the car, the core ring and a rocker arm connected to the core ring rotate, which drives the safety gear through the transmission device; wherein, the transmission device comprises a first component and a second component connected to each other by a pivot pin and a vertically oriented elongated hole, so that in an initial stroke of the rocker arm rotation, the pivot pin first moves in the elongated hole until the pivot pin engages with an end of the elongated hole, and then the rotation of the rocker arm is transmitted to the safety gear, thereby triggering the safety gear to be in frictional contact with the elevator guide rail.

Optionally, in an embodiment of the elevator safety device, the size of the elongated hole is configured to be greater than the stroke of car rebound when the governor is triggered by the remote triggering device.

Optionally, in an embodiment of the elevator safety device, the transmission device comprises: a vertical connecting rod pivotally connected with the rocker arm; and a rotary rod, with a first end thereof pivotally connected to a fixed bracket, a middle part thereof connected to the bottom of the vertical connecting rod, and a second end thereof connected to a pull actuator of a safety gear.

Optionally, in an embodiment of the elevator safety device, an elongated hole is provided at the bottom of the vertical connecting rod and a pivot pin is provided at the middle part of the rotary rod; or an elongated hole is provided on the pull actuator of the safety gear and a pivot pin is provided at the second end of the rotary rod.

Optionally, in an embodiment of the elevator safety device, the governor assembly further comprises a spring element acting on the rotary rod or the connecting rod to provide a retaining force to the rotary rod or the connecting rod during the car rebound.

An elevator system is further provided, which comprises the governor assembly or elevator safety device according to the various embodiments.

The governor assembly, elevator safety device and elevator system according to the present invention effectively prevent false triggering of the governor due to car rebound during an elevator emergency stop and unlocking of the governor due to car rebound after triggering of the safety gear.

BRIEF DESCRIPTION OF THE DRAWINGS

With reference to the accompanying drawings, the disclosure of the present application will become easier to understand. Those skilled in the art would readily appreciate that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Figure 1:
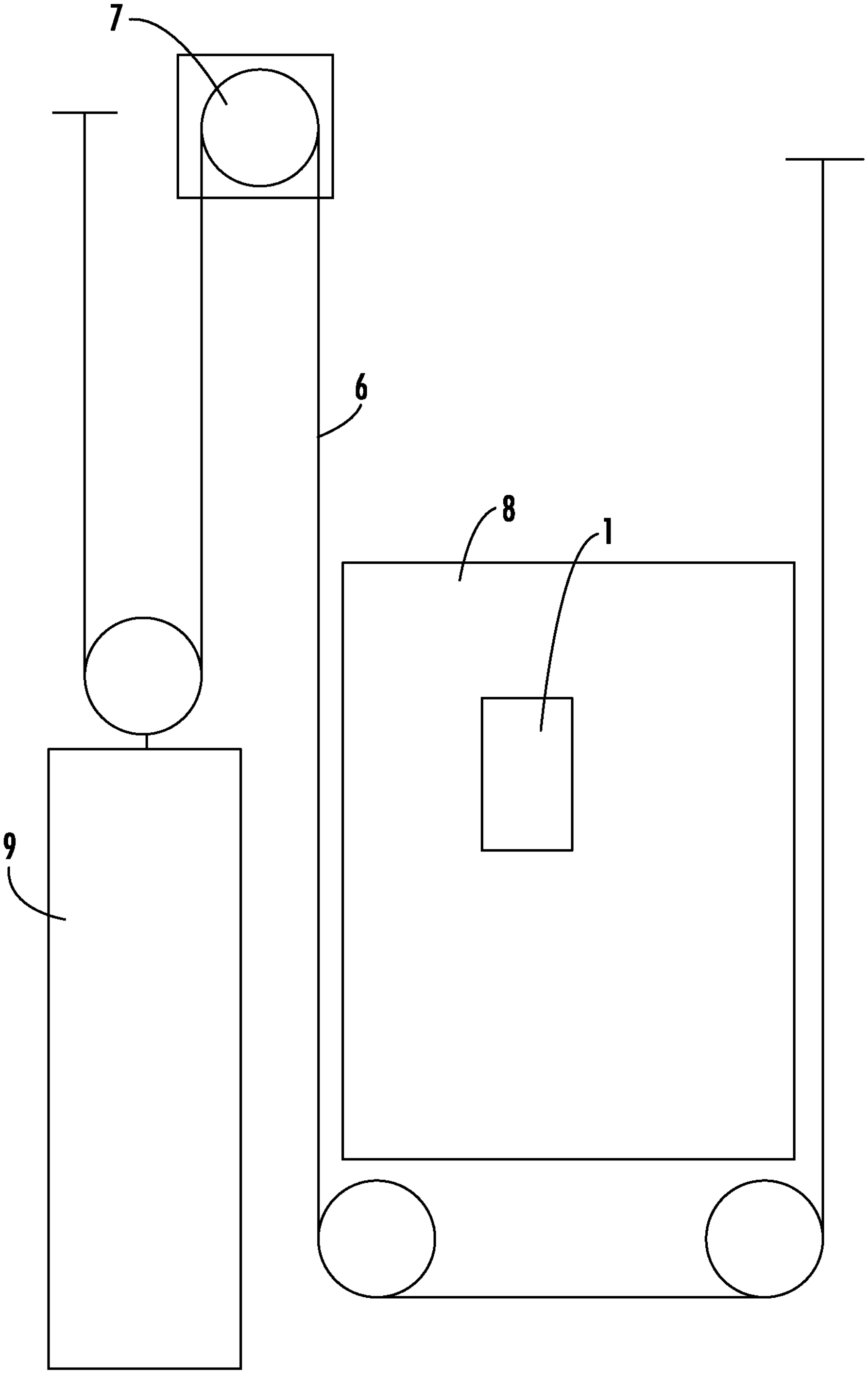
FIG. 1 shows a structural schematic diagram of an elevator system.

Referring to FIG. 1, a schematic diagram of an elevator system is shown, the elevator system comprising a tractor 7 at the top, a car 8, a counterweight 9, a rope 6 and several rope sheaves. Car 8 comprises a governor assembly 1 (schematically shown). Generally speaking, the weight of the counterweight 9 is configured to about 1.5 times the weight of the empty car 8, which makes the weights on both sides of the tractor 7 similar in actual use. The rotation of the tractor 7 drives the car 8 to go up and down. The tractor 7 is equipped with a brake device with power off protection. The brake device generally consists of a movable plate, which is separated from the friction disc on the drive shaft of the tractor under the action of both magnetic attraction force and spring acting force when the powered is on. Whereas, when the power is off, the magnetic attraction force disappears, and the acting force of the spring drives the movable plate so that the friction plate on it is brought into frictional contact with the friction disc on the drive shaft of the tractor to stop the drive shaft of the tractor. Since the brake device is critical to the safety of the elevator system, the tractor brake device needs to be tested before the elevator is put into service.

Figure 2:
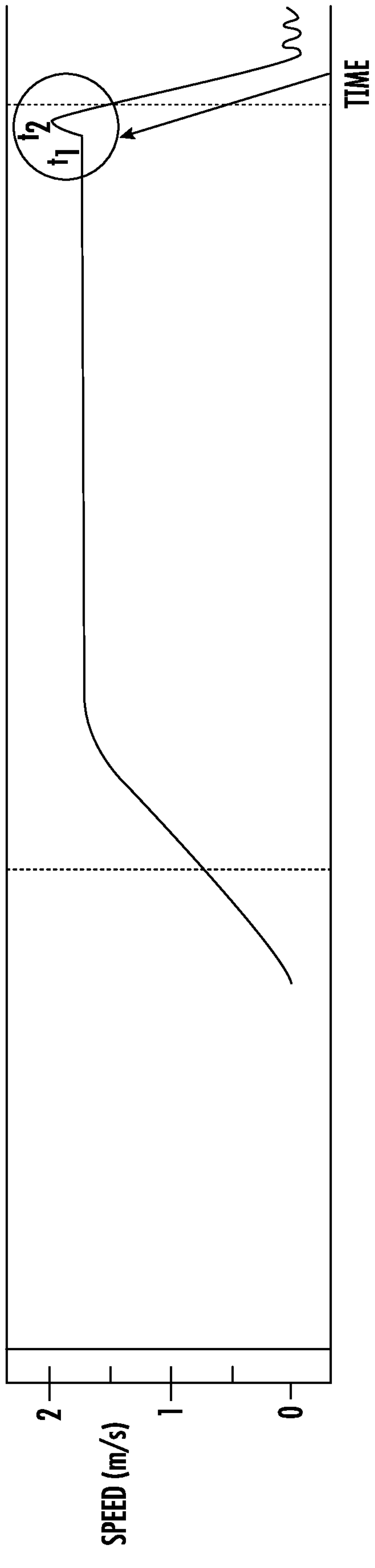
FIG. 2 shows the speed and time curves of the elevator car during the tractor brake system test.

When testing the tractor brake system, as shown in FIG. 2, first, the elevator speed gradually increases to the normal upgoing speed or the rated speed (approximately 1.7 m/s in this embodiment), then the power-cut test button is pressed at time point t1, while the power supply of the tractor and the solenoid coils of its brake system are cut, so the magnetic attraction force on the movable plate disappears. Until the time point t2, the friction disc on the movable plate of the tractor brake device is brought into contact with the friction disc on the drive shaft of the tractor as driven by the spring, producing a braking action. Because the movable plate displaces, there is a certain delay between time points t1 and t2 (e.g. about 150 ms). At this time, as the tractor drive shaft is powered cut and no longer outputs driving force (it is equivalent to a pulley), and due to the weight difference between the counterweight 9 and the car 8 as previously mentioned, an instantaneous accelerated ascend of the elevator car (or referred to as "car rebound") will occur, i.e. the curve between t1 and t2 as circled in FIG. 2. Whereas, after time point t2, the elevator will be gradually stopped under the action of the brake device. Although the above instantaneous acceleration does not reach the first triggering speed of the governor, it may lead to the unfolding of the centrifugal mechanism of the CMG governor due to the approximation of the instantaneous acceleration to the natural frequency of the governor, and thus lead to the false triggering of the trigger switch, which would cause various related problems, such as failure of delivery test or the need for technicians to restore the trigger switch of the governor.

Figure 3:
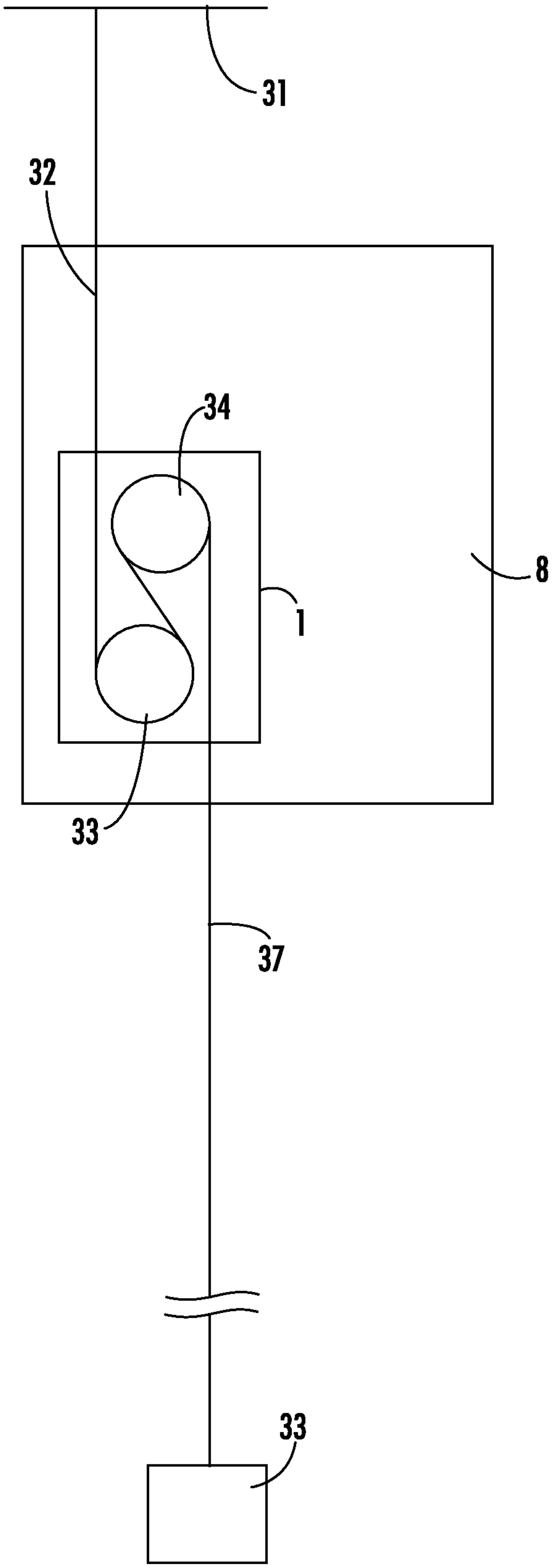
FIG. 3 shows a structural schematic diagram of a CMG assembly.
Figure 4:
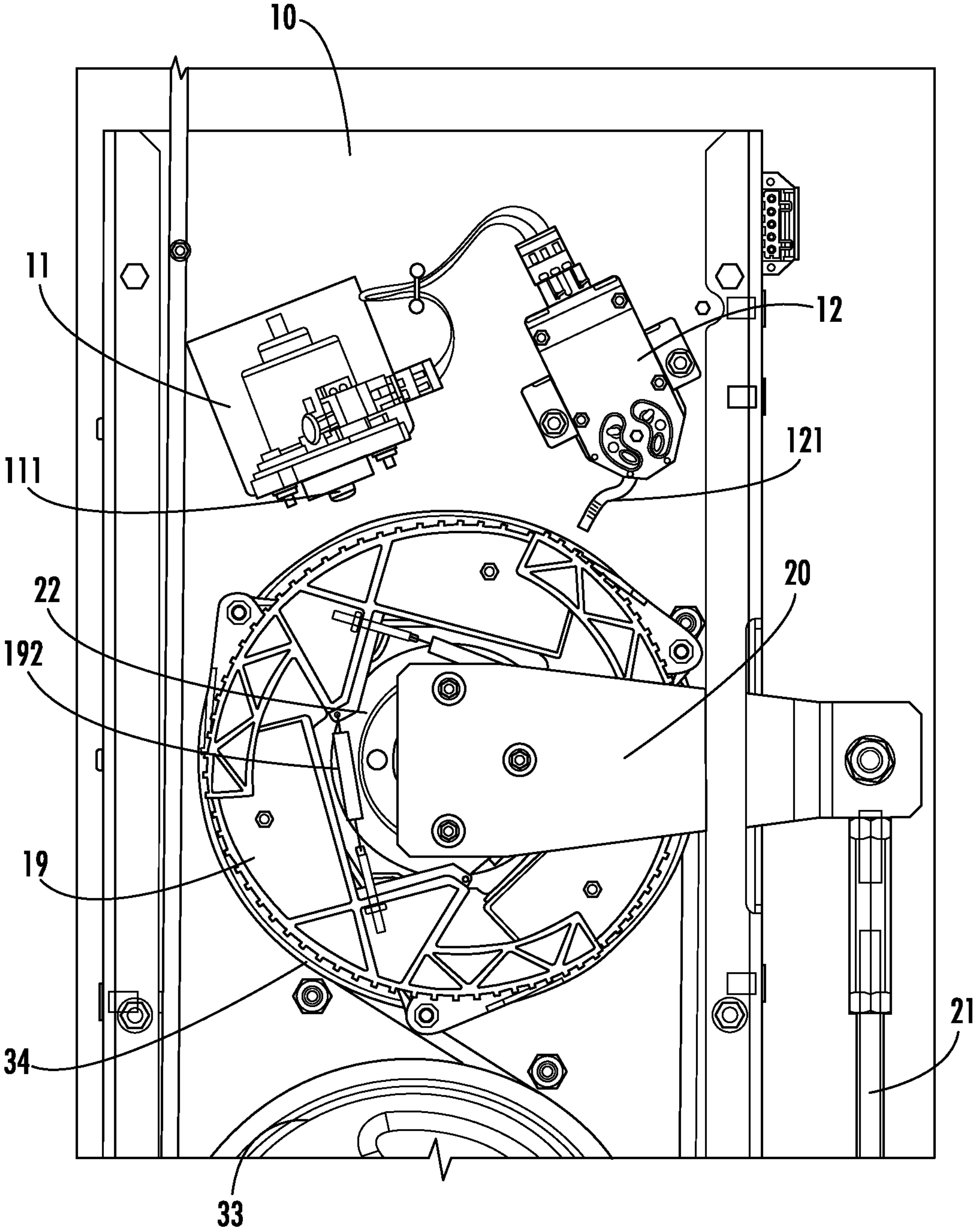
FIG. 4 shows a detailed structural diagram of a governor assembly according to an embodiment.

Next, the specific structure and installation of the CMG type governor are introduced with continued reference to FIGS. 3 and 4. FIG. 3 illustrates a car 8 mounted with a governor assembly 1. For a typical governor assembly 1, reference can be made, for example, to the type recorded in the U.S. Patent Publication No. US20130098711A1 of the Otis Elevator Company disclosed on Apr. 25, 2013, the full text of which is incorporated herein by reference. The governor assembly 1 comprises a guide pulley 33 and a governor rope sheave 34. The rope suspended from the hoistway top 31 wraps the guide pulley 33 and the governor rope sheave 34. The rope has an upstream rope section 32 of the governor and a downstream rope section 37 of the governor. The length of the upstream rope section 32 of the governor and the downstream rope section 37 of the governor constantly change as the car goes up and down. At the bottom of the hoistway, a weight 33 is suspended at the bottom of the downstream rope section 37 of the governor or the downstream rope section 37 is connected to a pulling device for providing the tension. When the car 8 goes up and down, the guide pulley 33 and the governor rope sheave 34 will rotate due to friction with the rope. The pitch circle rotation speed of the governor rope sheave 34 is identical with the running speed of the car, while the rotate speed of the governor corresponds to the running speed of the car. When the descent speed of the elevator car exceeds a threshold, for example, when the speed of the rope sheave exceeds the first triggering speed (also referred to as the electrical triggering speed), the centrifugal mechanism associated with the governor rope sheave 34 triggers the trigger switch, i.e. cutting off the power supply to the tractor and its brake device. And, when the speed of the rope sheave exceeds the second speed greater than the first triggering speed (also referred to as the mechanical triggering speed), the centrifugal mechanism triggers the mechanical brake device, stopping the elevator car by friction between the safety gear and the elevator car guide rail.

With continued reference to FIG. 4, a governor bracket 10, and the guide pulley 33 and the governor rope sheave 34 mounted thereon are shown. A centrifugal mechanism 19 is arranged on the rope sheave 34 and is in a contraction state. A trigger switch 12 at a first position on the radial outer side of the centrifugal mechanism 19 comprises a triggering end 121, and a remote triggering device 11 at a second position on the radial outer side of the centrifugal mechanism 19 comprises an operating end 111. As the elevator descends, the rope sheave 34 will rotate counterclockwise due to friction with the rope, and the centrifugal mechanism 19 will rotate with the rope sheave 34, as previously mentioned. When the elevator system is in danger and the car descends at a speed greater than the rated speed at which the elevator operates normally, e.g., 1.3 times the rated speed (which is smaller than the second triggering speed), the speed of the centrifugal mechanism 19 increases with the speed of rope sheave 34 to exceed the first triggering speed, so that the centrifugal mechanism 19 will unfold to a first triggering position, with its outer side contacting and flipping the triggering end 121 of the trigger switch 12, thereby cutting off the power supply to the tractor and its brake device so as to stop the drive shaft of the tractor and the car. On the other hand, if the descent speed of the car further increases (e.g. due to the breakage of rope on its top), for example, to 1.4 times the rated speed (as specified in the standards), the speed of the centrifugal mechanism 19 further increases with the speed of the rope sheave 34 to exceed the second triggering speed, so that the centrifugal mechanism 19 will unfold to a second triggering position, with its inner side contacting and coupling with a core ring 22 so that the rotation of the rope sheave will drive the core ring 22 to rotate, and also drive a rocker arm 20 fixed to the core ring 22 to rotate, thereby lifting a vertical connecting rod 21 so as to trigger the safety gear to be in friction with the car guide rail to stop the elevator car.

Figure 5:
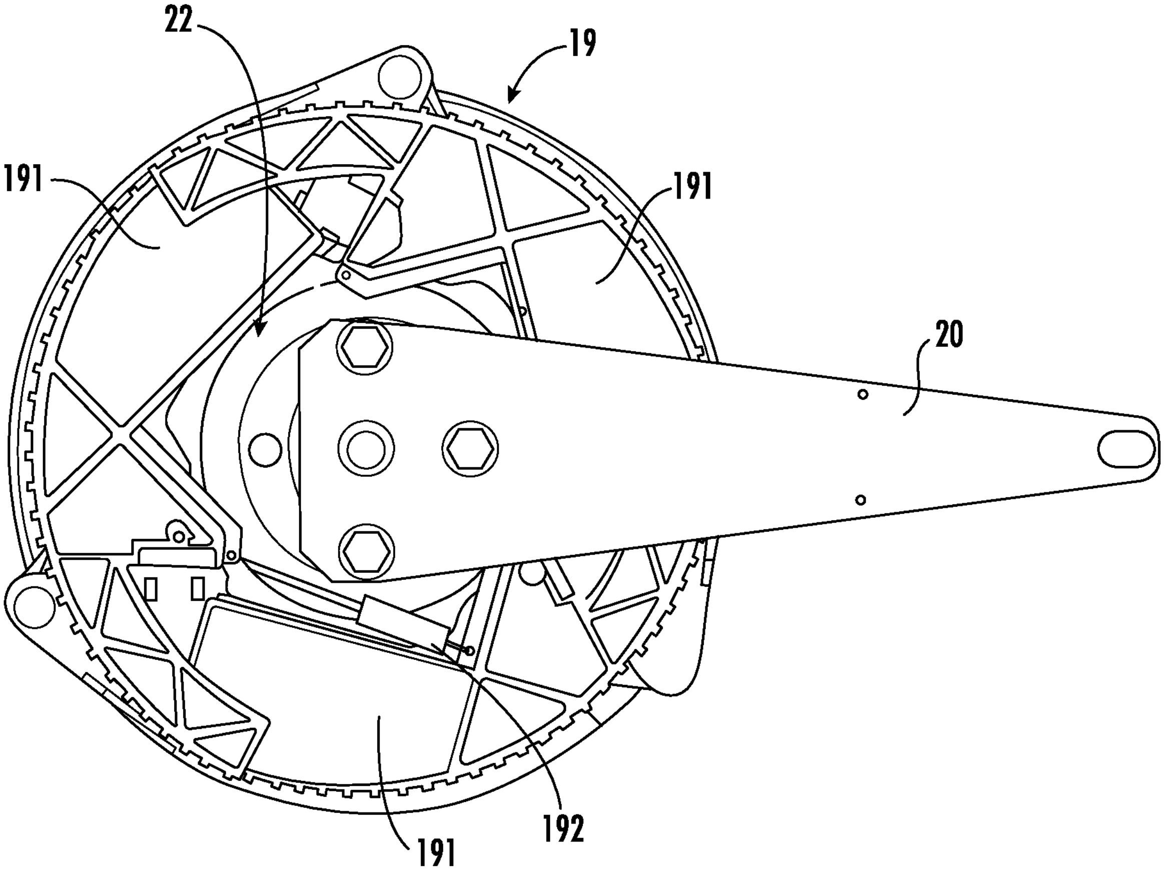
FIGS. 5 and 6 show, respectively, front and back views of the centrifugal mechanism of the governor assembly according to an embodiment in a contraction state.
Figure 6:
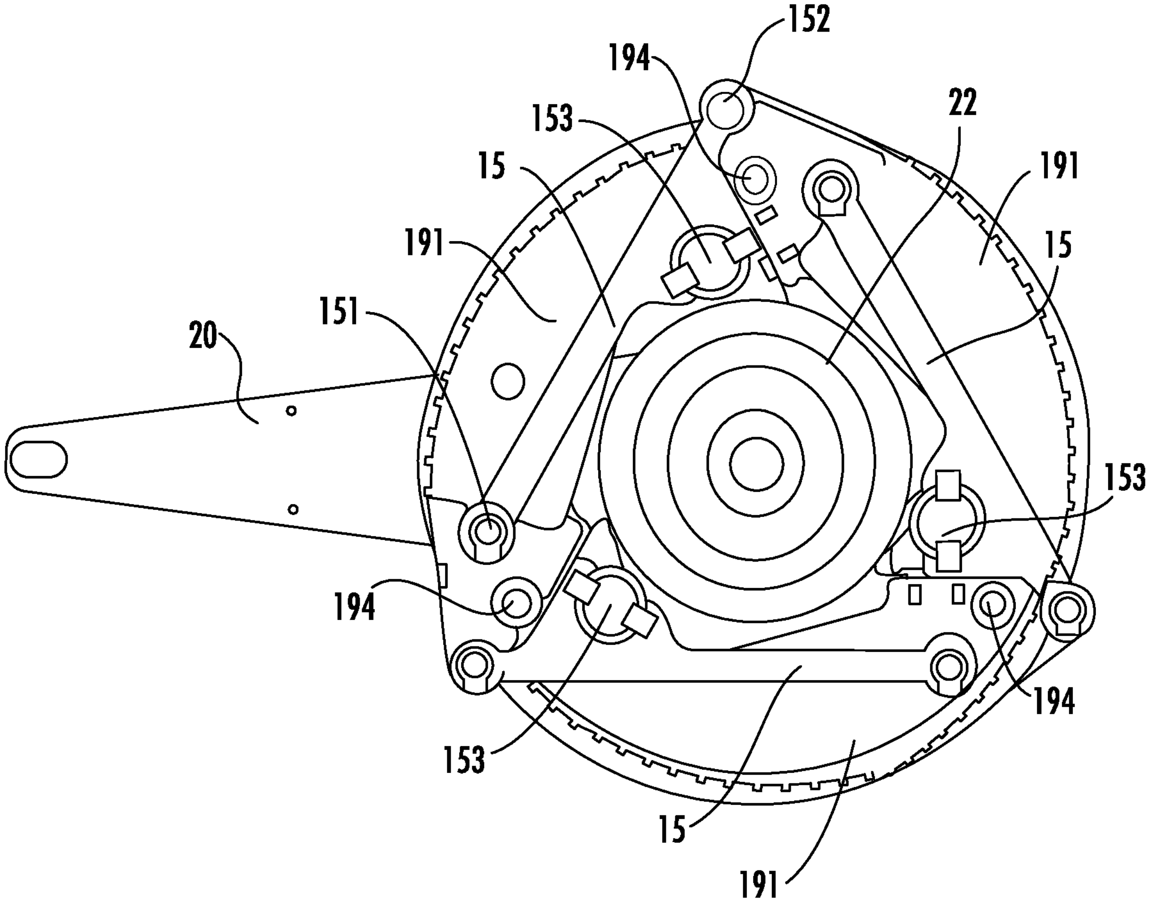
Figure 7:
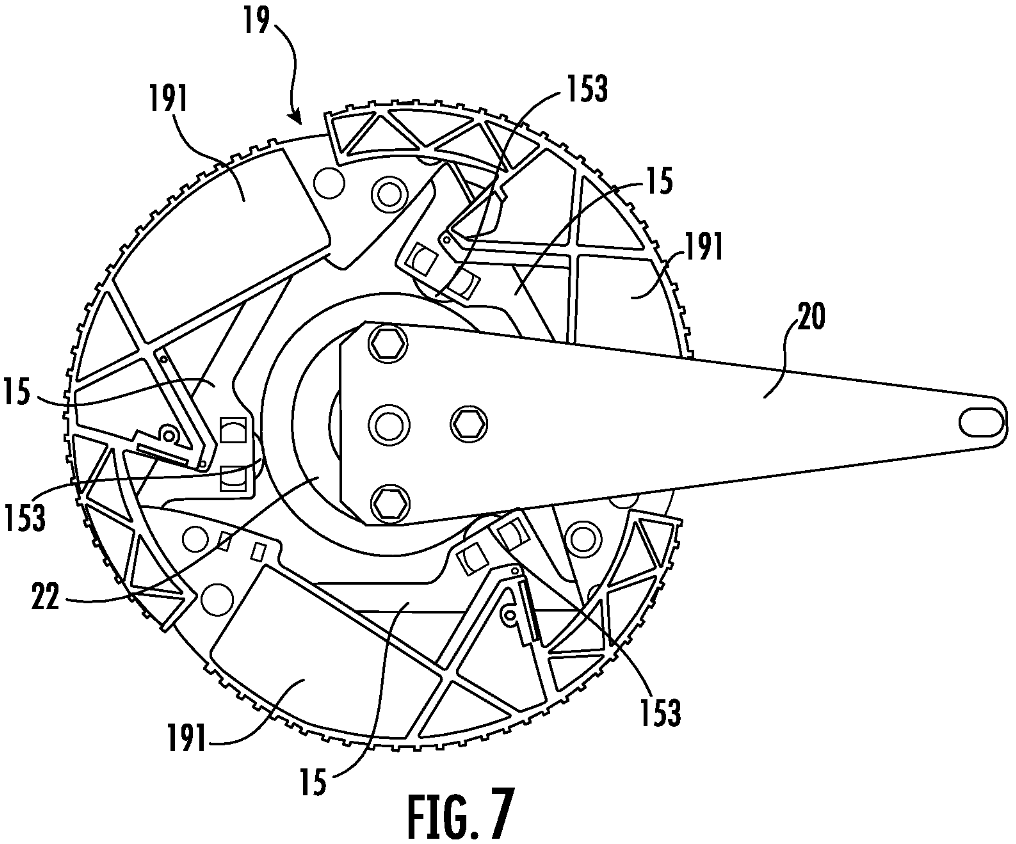
FIG. 7 shows a front view of a centrifugal mechanism of a governor assembly according to an embodiment when unfolded.

The centrifugal mechanism 19 according to the present invention is then described with reference to FIGS. 5 to 7.

The centrifugal mechanism 19 consists of a plurality of centrifugal members 191 pivotally fixed to the front of the rope sheave 34, such as three centrifugal members, each of which may comprise a centrifugal block bracket and a centrifugal block mounted thereon. The centrifugal block bracket may be made of, for example, plastics, and the centrifugal block may be made of, for example, a heavy object such as iron. Pivot center 194 of the plurality of centrifugal members 191 is visible in the back view shown in FIG. 6, i.e., each centrifugal member 191 is pivotally connected to the rope sheave 34 via the pivot center 194. The adjacent centrifugal members 191 are connected by a centrifugal mechanism connecting rod 15, which limits their relative motions and cause them to unfold synchronously. Specifically, as shown in FIG. 6, a first end 151 of the centrifugal mechanism connecting rod 15 is connected to a centrifugal member 191, and a second end 152 of the centrifugal mechanism connecting rod 15 is connected to the adjacent centrifugal member 191. The centrifugal mechanism further comprises a retaining mechanism for retaining the plurality of centrifugal members 191 in a contraction position, such as a tension spring 192 (FIG. 4) between adjacent centrifugal members 191 as shown in the figure, or alternatively a magnetic-based retaining mechanism. Centrifugal mechanism 19 rotates with the rope sheave 34. As the speed of the rope sheave increases, the centrifugal mechanism 19, driven by inertial force, tends to unfold as shown in FIG. 7. In the process of unfolding, the centrifugal mechanism first unfolds to the first triggering position, where the outer side of the centrifugal member 191 of the centrifugal mechanism first contacts and flips the triggering end 121 of the trigger switch 12, and then when unfolded to the second triggering position as shown in FIG. 7, rollers 153 on the inner side of the centrifugal mechanism connecting rod 15 of the centrifugal mechanism contacts the core ring 22, so that the centrifugal mechanism 19 is coupled with the core ring 22, thereby driving the core ring 22 and the rocker arm 20 connected to it to rotate.

Figure 8:
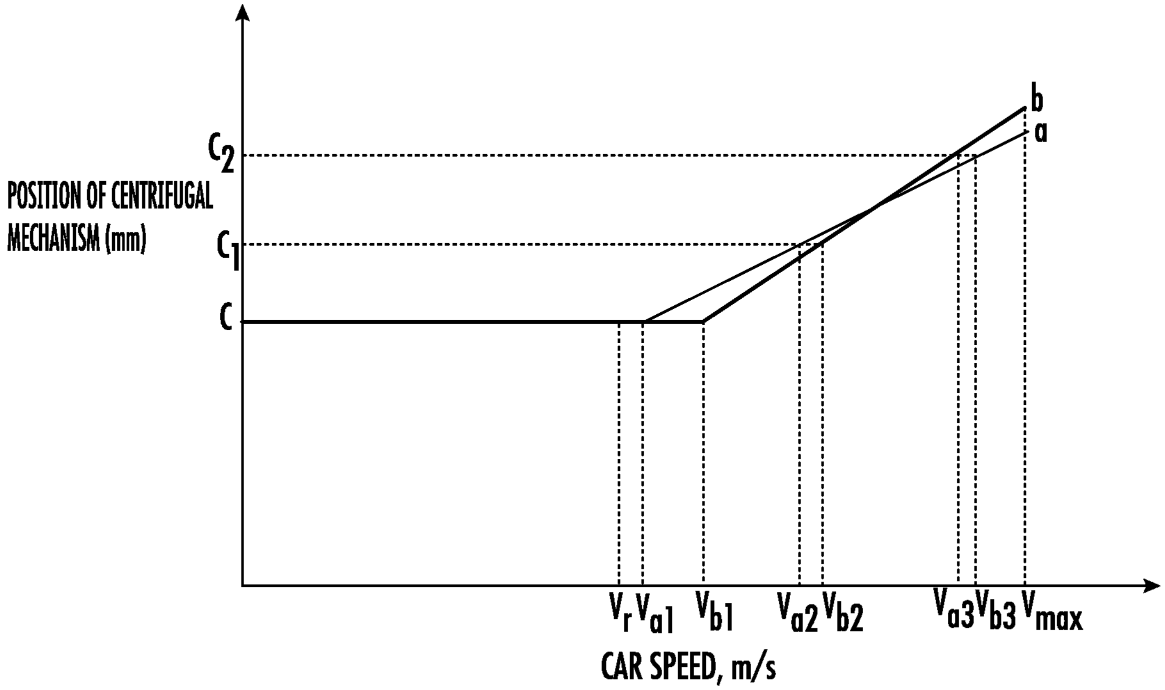
FIG. 8 shows a comparison of the characteristic curve of a centrifugal mechanism according to an embodiment with that of a conventional centrifugal mechanism.

With continued reference to FIG. 8, a schematic diagram showing the speed of the elevator car and the state of the centrifugal mechanism is shown. As previously described for FIGS. 3 and 4, the pitch circle rotation speed of the governor rope sheave is identical with the running speed of the car, so the speed of the governor corresponds to the speed of the elevator car. It should be appreciated that the speed of the car or the corresponding speed of the governor in FIG. 8, such as the first or second triggering speed, is measured in accordance with the standards with rotate speed increasing slowly. The so-called "slow increase" means to minimize the impact of acceleration on the governor assembly. Therefore, the acceleration should be smaller than the first acceleration. "Slow acceleration" has different definitions according to different test standards. "Slow increase" in the present application means that acceleration is smaller than the first acceleration, e.g. 0.1 $m/s^2$. In FIG. 8, position C indicates that the centrifugal mechanism 19 is in the contraction position. Position $C_1$ indicates that the centrifugal mechanism 19 is unfolded to the first triggering position where the trigger switch 12 is triggered, where the corresponding speed of the governor is called the first triggering speed or the electrical triggering speed. Position $C_2$ indicates that the centrifugal mechanism 19 is unfolded to the second triggering position coupled with the core ring 22 as shown in FIG. 7, where the corresponding speed of the governor is called the second triggering speed or the mechanical triggering speed. In FIG. 8, curve a indicates an elevator system equipped with a conventional centrifugal mechanism, in which $V_r$ represents the rated speed of the car. In such a centrifugal mechanism, due to the relatively small initial retaining force of the retaining mechanism (e.g., the pretension force of the tension spring is relatively small), when the descent speed of the car slowly increases to, for example, about $V_{a1}=1.05V_r$, centrifugal mechanism 19 has begun to unfold gradually. And, at the first triggering speed $V_{a2}$, centrifugal mechanism 19 is unfolded to the first triggering position $C_1$; at the second triggering speed $V_{a3}$, centrifuge 19 is unfolded to the second triggering position $C_2$ coupled with core ring 22, wherein $V_{a2}$ is in the range of, for example, 1.25-1.35$V_r$, and $V_{a3}$ is in the range of, for example, 1.4-1.5$V_r$. The inventor of the present invention has found that $V_{a1}$ is closely associated with the false triggering of the governor caused by the "car rebound" phenomenon in the brake system test of the tractor. More specifically, by setting the governor speed corresponding to $V_{a1}$ to be greater than a first threshold, false triggering of the governor can be avoided. In some embodiments, the first threshold is equal to or greater than the speed of the rope sheave corresponding to 115% of the rated speed of the elevator car. In some embodiments, the first threshold value is equal to or greater than the speed of the rope sheave corresponding to 120% of the rated speed of the elevator car. When $V_{a1}>1.15V_r$, the governor assembly will basically not be triggered by mistake when the "car rebound" phenomenon occurs, which can be achieved by configuring the retaining force of the retaining mechanism in the contraction position. Specifically, the retaining mechanism can be configured to still retain the plurality of centrifugal members at the contraction position C when the speed of the rope sheave slowly increases to 115% of the rated speed of the elevator. The so-called "slow increase" refers to acceleration being smaller than 0.1 $m/s^2$. In some embodiments, the retaining mechanism is configured to still retain the plurality of centrifugal members at the contraction position C when the speed of the rope sheave corresponds to 120% of the rated speed of the elevator.

As shown in the figures, in some embodiments, the retaining mechanism is a plurality of tension springs connected between the various centrifugal members. To achieve the aforementioned effect, for example, to achieve the effect shown in curve b in FIG. 8, where $V_{b1}$ is the corresponding car speed when the centrifugal mechanism starts to unfold, which corresponds to 1.16 times of $V_r$, a plurality of tension springs can be configured to be further pre-stretched at the contraction position or the rigidity of the tension spring can be increased. For example, the characteristics of the tension springs can be changed and the tension springs are further pre-stretched at the contraction position C to accumulate more elastic potential energy, so as to resist the inertia force to retain the centrifugal mechanism in the contraction position before the car speed reaches $1.15V_r$. In addition, the characteristics of the tension spring can be adjusted so that the corresponding first and second triggering speeds $V_{b1}$ and $V_{b2}$ still meet the standard requirements, e.g., close to the original first and second triggering speeds $V_{a1}$ and $V_{a2}$. In some embodiments, the retaining mechanism may be a magnetic attraction device between the various centrifugal members configured to provide sufficient magnetic attraction force in the contraction position, so that the magnetic attraction force will still retain the plurality of centrifugal members in the contraction position when the speed of the rope sheave slowly increases to 115% of the rated speed of the elevator.

Figure 9:
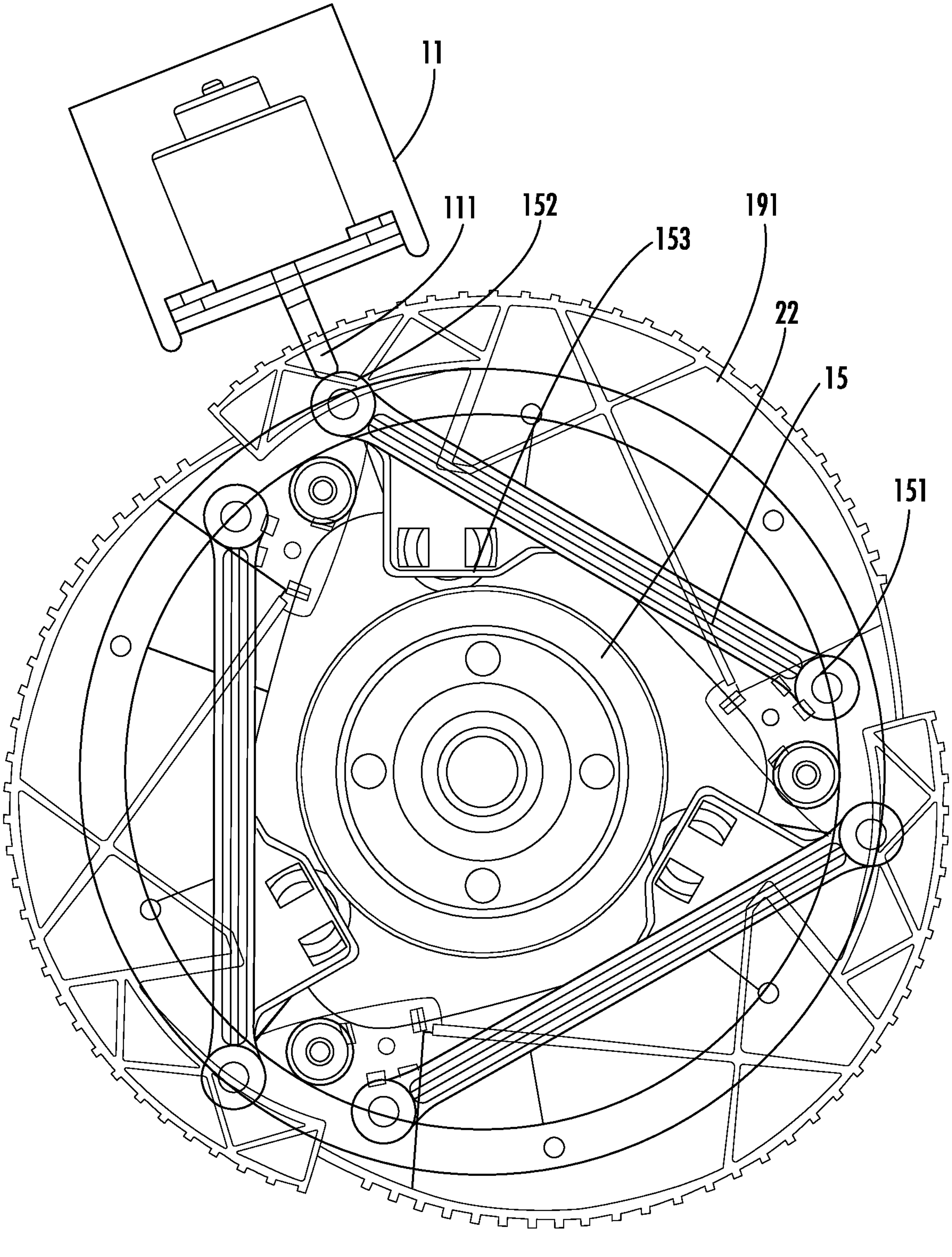
FIG. 9 shows a schematic diagram of a centrifugal mechanism of a governor assembly according to an embodiment when operated by a remote triggering device.
Figure 10:
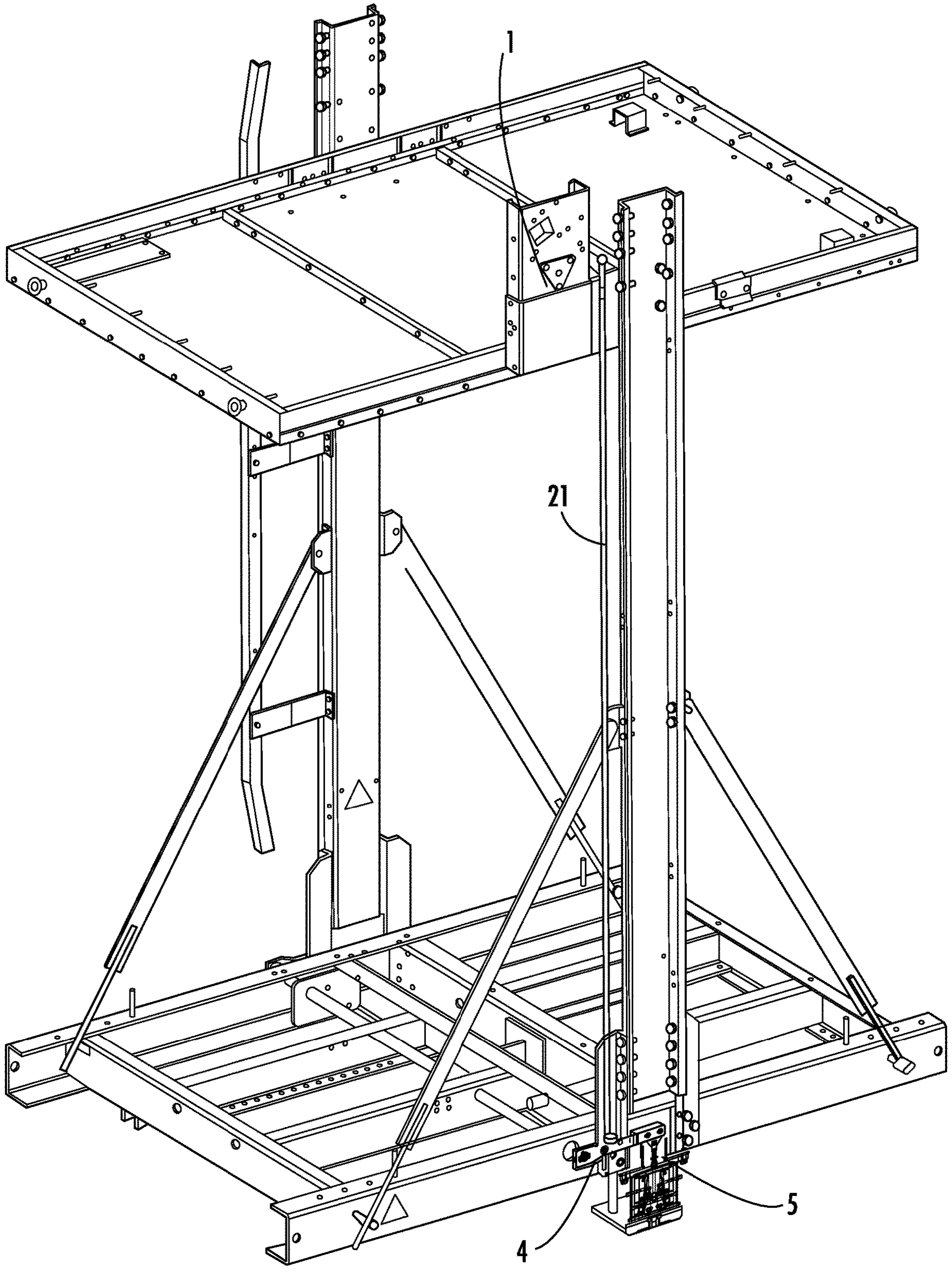
FIG. 10 shows a structural schematic diagram of an elevator safety device for an elevator system according to an embodiment.

With continued reference to FIG. 9, the operating principle of the remote triggering device 11 is illustrated. The remote triggering device is, for example, a solenoid switch, comprising a contact 111 that is normally in an idle position shown in FIG. 4 and thus does not affect the operation of the governor assembly. The remote triggering device 11 is associated with a remote trigger switch in the control room. Before delivery or during use of the elevator system, it is necessary to regularly check whether the safety gear brake system of the governor assembly is functioning properly. To this end, the remote trigger switch in the control room is first pressed, and when a remote trigger signal is received, the contact 111 of the remote triggering device 11 moves radially inward from the idle position separated from the centrifugal mechanism to the operating position (shown in FIG. 9). At the operating position, the contact acts on the centrifugal mechanism of the governor assembly, specifically the arc surface of the second end 152 of the centrifugal connecting rod 15, forcing the centrifugal mechanism to unfold to the second triggering position $C_2$ when it rotates past the contact 111. As a result, the centrifugal mechanism is coupled with the core ring 22 to rotate the rocker arm and pull the safety gear to stop the car. In an alternative embodiment, the remote triggering device may have a structure different from what is illustrated, and act on the centrifugal mechanism to force it to unfold to a mechanical brake position upon receipt of a remote trigger signal. As shown in FIG. 10, the governor assembly 1 is generally mounted on the top of the car and is connected to the safety gear 5 on the bottom of the car through a transmission device. The governor assembly 1 and the transmission device can be collectively referred to as the elevator safety device. The transmission device may comprise a vertical connecting rod 21 and a rotary rod 4, which will be described in detail below. It should be appreciated that during the test, the aforementioned electrical brake system is bypassed and therefore is not functioning, so the mechanical brake system is hereby separately tested.

Figure 11:
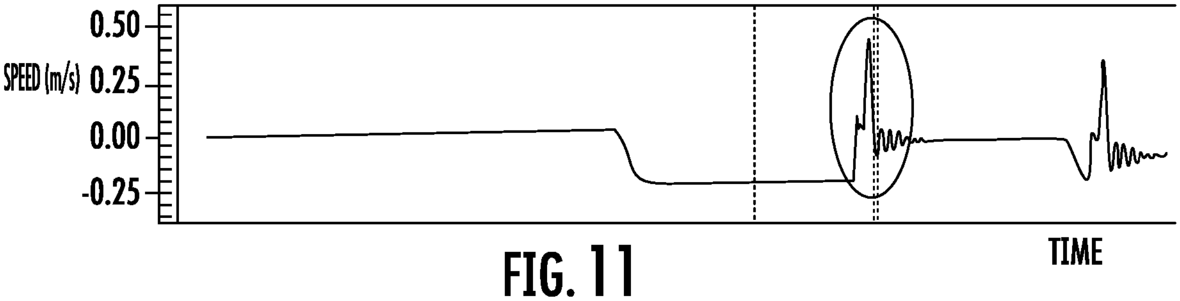
FIG. 11 shows the speed and time curves of the elevator car when performing a remote triggering test.
Figure 12:
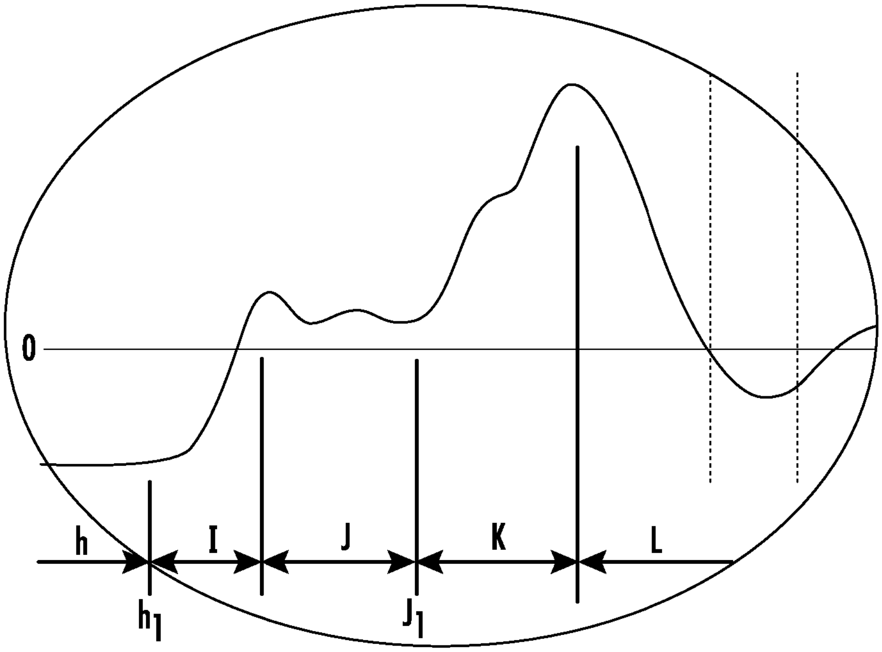
FIG. 12 shows an enlarged view of the circled portion of FIG. 11.

FIG. 11 shows a curve of the speed and time of the elevator car reflecting the "car rebound" phenomenon of the elevator during the remote triggering test. FIG. 12 shows an enlarged view of the circled portion of FIG. 11. In the remote triggering test, the elevator descends at a test speed of, for example, 0.2 m/s (h section), and the remote trigger switch is pressed at position hi. In stage I, due to the braking effect of the safety gear, the speed of the elevator car decreases to basically 0 and maintains at stage J. In position Ji, the car has been stopped but the tractor is still running, so at this point, rope slipping will be detected at the tractor. The tractor has a protection system, which will cut off the power supply of the tractor at the moment rope slipping is detected at time point Ji. In stage K, also due to the time difference between the power cut and the functioning of the tractor braking device as mentioned above, as well as the weight of the counterweight being greater than that of the empty car, the "car rebound" phenomenon will occur (the safety gear are designed to prevent the car from moving downward only). Finally, in section L, the car will be stopped due to the functioning of the tractor brake system. Under normal circumstances, after the remote triggering test, when the tractor is powered on again, the car cannot continue to go downward as the safety gear is still functioning. However, the safety gear will be unlocked due to the aforementioned "car rebound" phenomenon, which makes it possible for the elevator car to continue to go downward after the remote triggering test. In theory, however, if the safety gear is functioning, the elevator car should not be able to continue to go downward. Therefore, this will cause the tester to doubt whether the safety gear is working properly or not, and results in that the elevator cannot pass the remote triggering test.

Therefore, in some embodiments of the present invention, the transmission device is configured to comprise a first component and a second component connected to each other by a pivot pin and a vertically oriented elongated hole, such that during the initial stroke of rotation of the rocker arm in the first direction, the pivot pin first moves in the elongated hole until the pivot pin engages with the end of the elongated hole, and then the rotation of the rocker arm is transmitted to the safety gear, thereby pulling the safety gear to be in frictional contact with the elevator guide rail.

Figure 13:
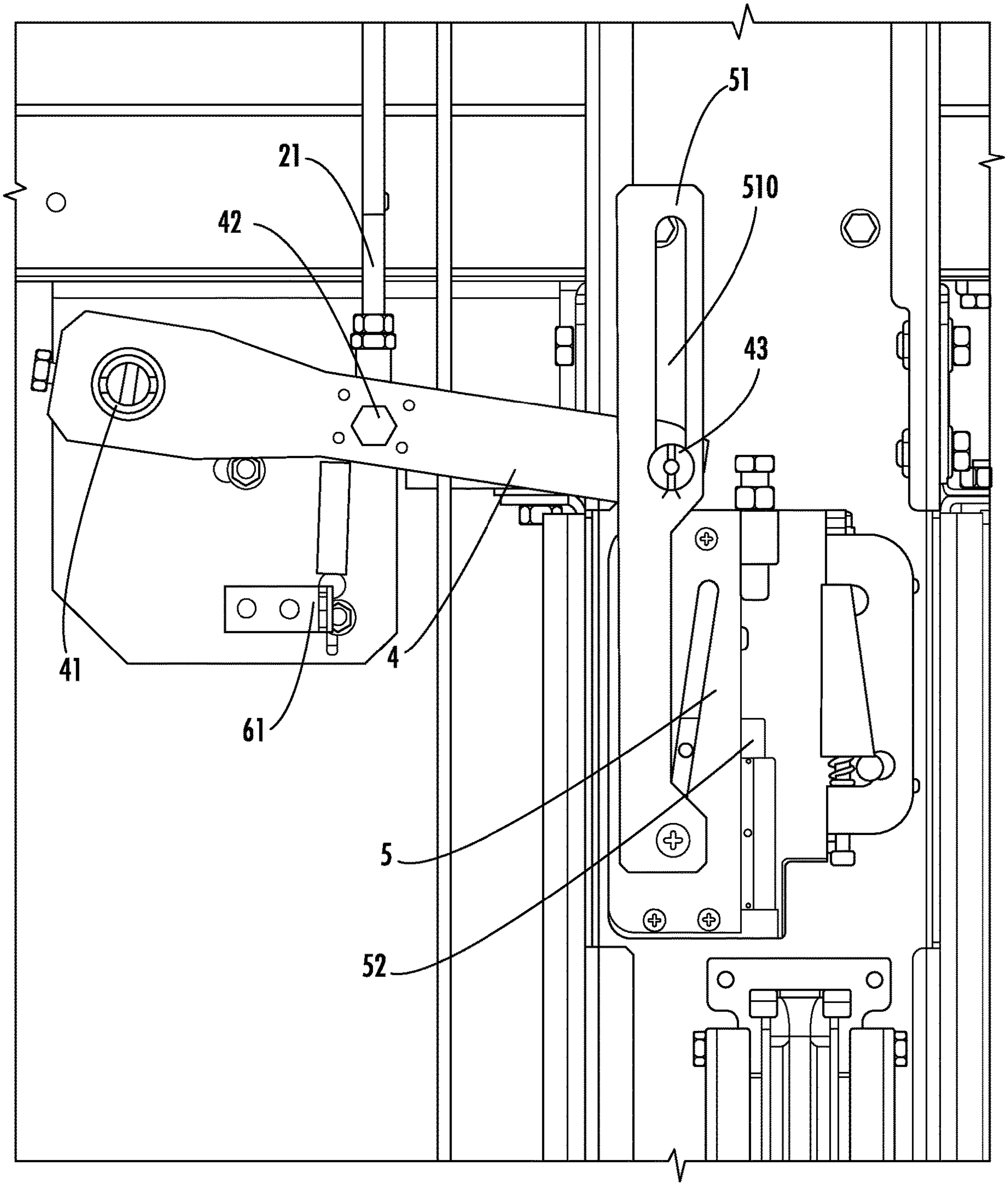
FIG. 13 shows a pull mechanism and a safety gear according to an embodiment.

More specifically, as shown in FIG. 13, the transmission device may comprise: a vertical connecting rod 21 pivotally connected to the rocker arm; a rotary rod 4, a first end 41 of which pivotally connected to a fixed bracket, a middle part 42 of which connected to the bottom of the vertical connecting rod 21, and a second end 43 of which connected to a pull actuator 51 of the safety gear, wherein the pull actuator 51 of the safety gear comprises an elongated hole 510 to engage with the pivot pin of the second end 43 of the rotary rod. Referring to FIGS. 4 and 13, the governor assemblies shown are both in a non-triggering position. In the non-triggering position, when the governor is mechanically triggered, the rocker arm 20 rotates counterclockwise with the core ring 22 as shown in FIG. 4, and the vertical connecting rod 21 is lifted with the rotation of the rocker arm 20, thereby lifting the rotary rod 4. During the initial stroke, the pivot pin of the second end 43 of the rotary rod 4 will move in the elongated hole 510 of the pull actuator 51, until the pivot pin engages with the top of the elongated hole 510. During the initial stroke, the transmission device prevents the rotation of the rocker arm from being transmitted to the safety gear. Subsequently, the second end 43 of the rotary rod 4 will contact the upper end of the elongated hole 510 of the pull actuator 51, whereby further rotation of the rotary rod 4 will drive the pull actuator 51 up to lift the wedge block 52, which, together with a fixed wedge block 53, clamps the car guide rail therebetween (not shown) for braking. However, due to the "car rebound" phenomenon in stage K above, on the one hand, the rope sheave and the centrifugal mechanism on it will rotate clockwise as shown in FIG. 4, while the centrifugal mechanism, though about to separate from the core ring, may still exert a force on the core ring due to friction to make it rotate reversely, so that the vertical connecting rod 21 will descend (in addition, the gravity of the vertical connecting rod 21 itself also makes it descend), and on the other hand, the safety gear 5 will ascend with the car, where if no elongated hole 510 is provided, the vertical connecting rod 21 and the rotary rod 4 may be driven to be reset and thus the safety gear 5 is unlocked. However, when elongated hole 510 is provided, safety gear 5 will not push up the rotary rod 4 when the "car rebound" occurs, because the pivot pin of the rotary rod 4 will move in the elongated hole 510 of the pull actuator 51 during the car rebound. Therefore, "car rebound" will not cause reset of vertical connecting rod 21 and rotary rod 4 and unlock of safety gear. The vertical connecting rod 21 and rotary rod 4 can be reset and the safety gear 5 can be unlocked only when the car continues to ascend. In some embodiments, the size of the elongated hole 510 is configured to be greater than the stroke of car rebound when the governor is mechanically triggered by the remote triggering device. In some embodiments, as shown in FIG. 13, the governor assembly may also comprise a spring element 61 acting on the rotary rod 4 or the vertical connecting rod 21 to provide sufficient retaining force to the rotary rod and the connecting rod during the car rebound, i.e. to retain the governor centrifugal mechanism in an unfolding-locked state.

Figure 14:
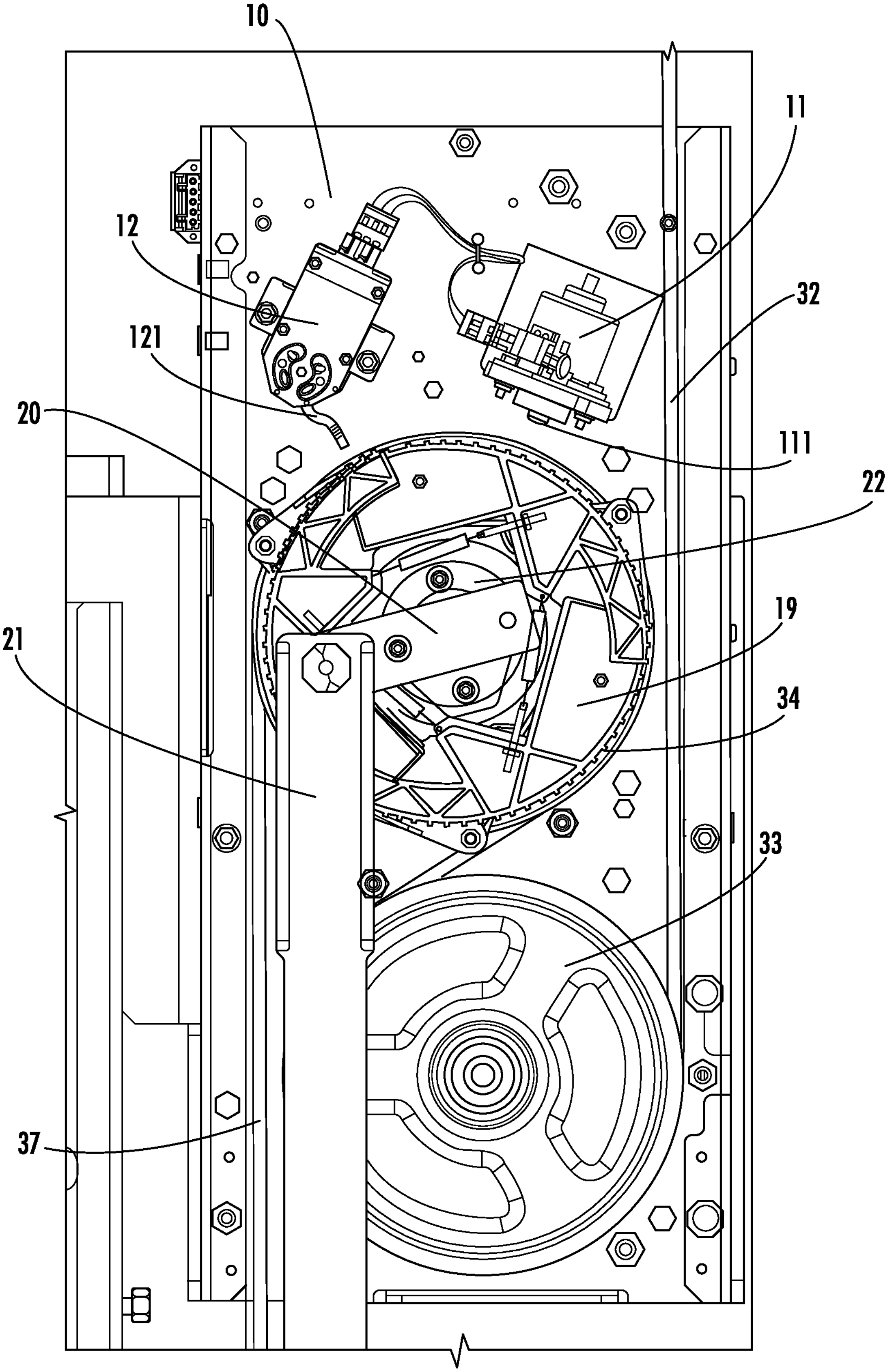
FIGS. 14 and 15 show, respectively, a schematic diagram of the respective parts of the governor assembly, pull mechanism and safety gear of an elevator safety device according to another embodiment.
Figure 15:
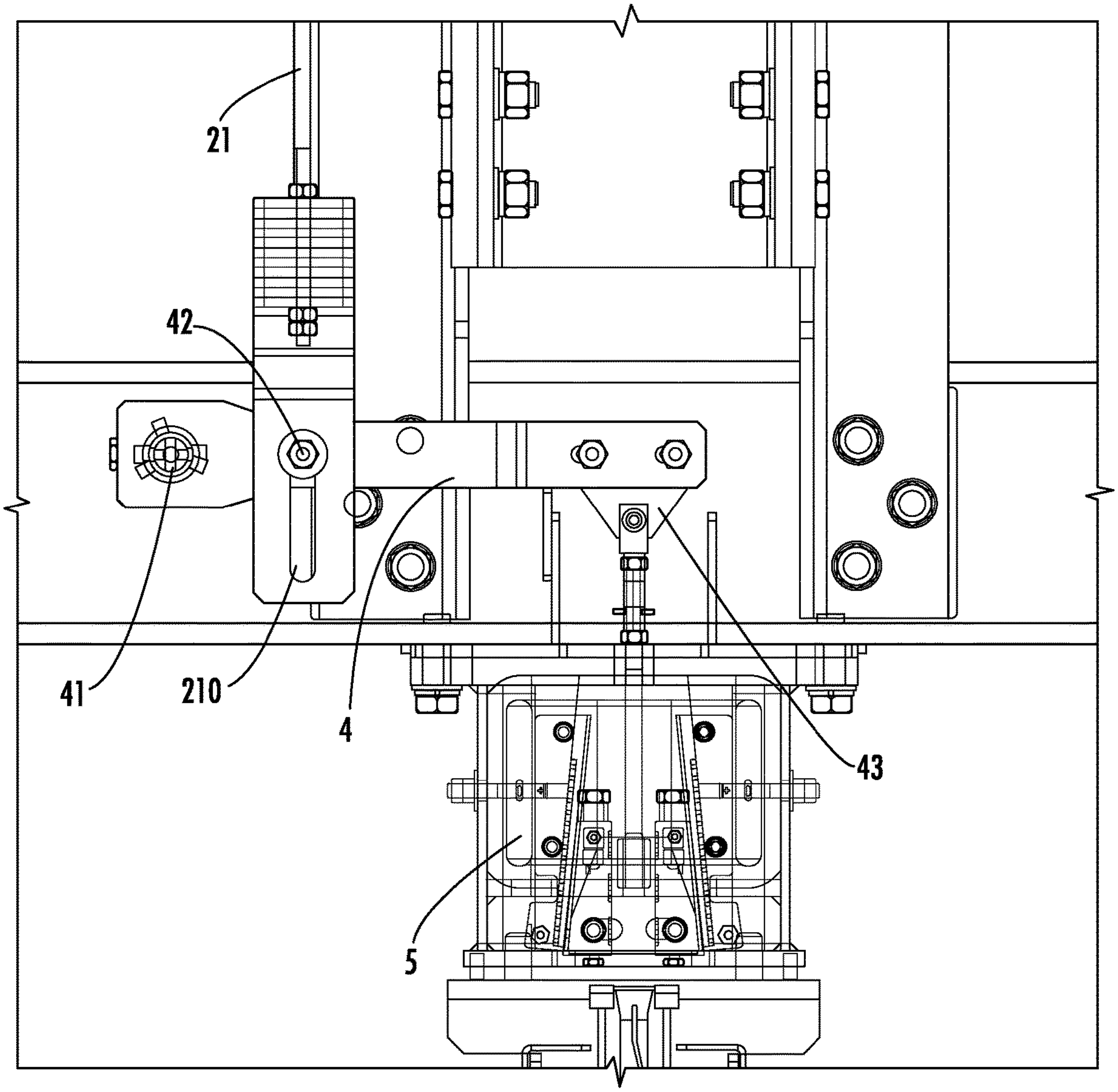

With continued reference to FIGS. 14 and 15, structures of governors according to alternative embodiments are shown. FIG. 14 shows an alternative form for rocker arm 20 and vertical connecting rod 21. As shown in FIG. 15, in this alternative embodiment, an elongated hole 210 is provided at the bottom of the vertical connecting rod 21, and a pivot pin is provided at the middle part 42 of the rotary rod. The system can operate in a manner similar to that of the system in the embodiment shown in FIG. 13. It should be appreciated that, although specific embodiments of pivot pins and elongated holes are described in conjunction with FIGS. 13 to 15, pivot pins and elongated holes may be arranged anywhere on the transmission device, e.g., between the rocker arm and the vertical connecting rod. In addition, in some embodiments, the transmission mechanism may differ from the type shown, and pivot pins and elongated holes may be provided in any suitable positions.

The specific embodiments of the present application described above are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be appreciated that these modifications or changes should be included within the scope of patent protection of the present application.

What is claimed is:

1. A governor assembly comprising:

a bracket;

a rotatable rope sheave mounted on the bracket; and a centrifugal mechanism associated with the rope sheave;

wherein, the centrifugal mechanism comprises:

a plurality of centrifugal members pivotally connected to the rope sheave, the plurality of centrifugal members being capable of unfolding under an inertial force associated with the speed of the rope sheave; and a retaining mechanism by which the plurality of centrifugal members are retained in a contraction position;

wherein, the retaining mechanism is configured to retain the plurality of centrifugal members in the contraction position when the speed of the rope sheave increases to a first threshold with an acceleration smaller than a first acceleration.

2. The governor assembly according to claim 1, wherein the first threshold is equal to or greater than the speed of the rope sheave corresponding to 115% of a rated speed of an elevator car.

3. The governor assembly according to claim 1, wherein the first threshold is equal to or greater than the speed of the rope sheave corresponding to 120% of a rated speed of an elevator car.

4. The governor assembly according to claim 1, wherein the plurality of centrifugal members progressively unfold under the inertial force as the speed of the rope sheave increases, and a trigger switch is provided on a radial outer side of the centrifugal mechanism on the bracket, wherein when the speed of the rope sheave reaches a first triggering speed greater than the first threshold, the plurality of centrifugal members unfold to a first triggering position, and the trigger switch is triggered by an outer side of one of the plurality of centrifugal members.

5. The governor assembly according to claim 4, wherein the first triggering speed corresponds to the speed of the rope sheave when the speed of the elevator car is greater than 130% of the rated speed.

6. The governor assembly according to claim 1, wherein the centrifugal mechanism is configured so that when the speed of the rope sheave reaches a second triggering speed greater than the first triggering speed, the plurality of centrifugal members unfold to a second triggering position, in which inner sides of the plurality of centrifugal members are connected to a core ring such that rotation of the rope sheave drives the core ring and a rocker arm connected to the core ring to rotate, wherein the rocker arm is connected to a safety gear through a transmission device, so that rotation of the rocker arm brings the safety gear to be in confliction with an elevator guide rail.

7. The governor assembly according to claim 6, wherein the governor assembly further comprises a remote triggering device on a radial outer side of the centrifugal mechanism on the bracket that acts on the centrifugal mechanism upon receipt of a trigger signal from a remote trigger switch to force the centrifugal mechanism to unfold to the second triggering position.

8. The governor assembly according to claim 1, wherein the retaining mechanism is a tension spring connected between adjacent centrifugal members, the tension spring being configured to be pre-stretched at the contraction position.

9. An elevator system, wherein the elevator system comprises the governor assembly according to claim 1.

10. A governor assembly comprising:

a bracket;

a rotatable rope sheave mounted on the bracket; and a centrifugal mechanism associated with the rope sheave;

wherein, the centrifugal mechanism comprises:

a plurality of centrifugal members pivotally connected to the rope sheave, the plurality of centrifugal members being capable of unfolding under an inertial force associated with the speed of the rope sheave; and a retaining mechanism by which the plurality of centrifugal members are retained in a contraction position;

wherein, the retaining mechanism is configured to retain the plurality of centrifugal members in the contraction position when the speed of the rope sheave increases to a first threshold with an acceleration smaller than a first acceleration;

wherein the retaining mechanism is a magnetic attraction device between adjacent centrifugal members configured to provide sufficient magnetic attraction force at the contraction position, so that the plurality of centrifugal members are still retained at the contraction position when the speed of the rope sheave slowly increases to a speed corresponding to 115% of the rated speed of the elevator.

11. An elevator safety device, comprising:

a governor assembly comprising:

a bracket;

a rotatable rope sheave mounted on the bracket; and a centrifugal mechanism associated with the rope sheave;

wherein, the centrifugal mechanism comprises:

a plurality of centrifugal members pivotally connected to the rope sheave, the plurality of centrifugal members being capable of unfolding under an inertial force associated with the speed of the rope sheave; and a retaining mechanism by which the plurality of centrifugal members are retained in a contraction position;

wherein, the retaining mechanism is configured to retain the plurality of centrifugal members in the contraction position when the speed of the rope sheave increases to a first threshold with an acceleration smaller than a first acceleration; and a transmission device associated with the governor assembly;

wherein, when the centrifugal mechanism is at a second triggering position, the plurality of centrifugal members couple the rope sheave with the core ring, so that when the rope sheave rotates in a direction corresponding to a descent direction of the car, the core ring and the rocker arm connected to the core ring rotate, which drives the safety gear through the transmission device, and wherein, the transmission device comprises a first component and a second component connected to each other through a pivot pin and a vertically oriented elongated hole, so that during an initial stroke of the rocker arm rotation, the pivot pin first moves in the elongated hole until the pivot pin engages with an end of the elongated hole, and then the rotation of the rocker arm is transmitted to the safety gear, thereby triggering the safety gear to be in frictional contact with the elevator guide rail.

12. The elevator safety device according to claim 11, wherein a size of the elongated hole is configured to be greater than a stroke of car rebound when the governor is triggered by the remote triggering device.

13. The elevator safety device according to claim 11, wherein the transmission device comprises:

a vertical connecting rod pivotally connected to the rocker arm; and a rotary rod, with a first end thereof pivotally connected to a fixed bracket, a middle part thereof connected to the bottom of the vertical connecting rod, and a second end thereof connected to a pull actuator of the safety gear.

14. The elevator safety device according to claim 13, wherein an elongated hole is provided at the bottom of the vertical connecting rod and a pivot pin is provided at the middle part of the rotary rod; or an elongated hole is provided on the pull actuator of the safety gear and a pivot pin is provided at the second end of the rotary rod.

15. The elevator safety device according to claim 13, wherein the governor assembly further comprises a spring element acting on the rotary rod or the connecting rod to provide a retaining force to the rotary rod or the connecting rod during the car rebound.

16. An elevator safety device, comprising:

a governor assembly and a transmission device associated with the governor assembly;

the governor assembly comprising:

a bracket;

a rope sheave rotatably mounted on the bracket;

a centrifugal mechanism associated with the rope sheave; and a remote triggering device on a radial outer side of the centrifugal mechanism on the bracket, wherein when the centrifugal mechanism is triggered by the remote triggering device, the plurality of centrifugal members couple the rope sheave with a core ring, so that when the rope sheave rotates in a direction corresponding to a descent direction of the car, the core ring and the rocker arm connected to the core ring rotate, which drives the safety gear through the transmission device;

wherein, the transmission device comprises a first component and a second component connected to each other by a pivot pin and a vertically oriented elongated hole such that, in an initial stroke of the rocker arm rotation, the pivot pin first moves in the elongated hole until the pivot pin engages with an end of the elongated hole, and then the rotation of the rocker arm is transmitted to the safety gear, thereby triggering the safety gear to be in frictional contact with the elevator guide rail.

17. The elevator safety device according to claim 16, wherein size of the elongated hole is configured to be greater than a stroke of car rebound when the governor is triggered by the remote triggering device.

18. The elevator safety device according to claim 16, wherein the transmission device comprises:

a vertical connecting rod pivotally connected with the rocker arm; and a rotary rod, with a first end thereof pivotally connected to a fixed bracket, a middle part thereof connected to the bottom of the vertical connecting rod, and a second end thereof connected to a pull actuator of a safety gear.

19. The elevator safety device according to claim 18, wherein an elongated hole is provided at the bottom of the vertical connecting rod and a pivot pin is provided at the middle part of the rotary rod; or an elongated hole is provided on the pull actuator of the safety gear and a pivot pin is provided at the second end of the rotary rod.

20. The elevator safety device according to claim 16, wherein the governor assembly further comprises a spring element acting on the rotary rod or the connecting rod to provide a retaining force to the rotary rod or the connecting rod during the car rebound.

* * * * *